United States Patent
Cunningham et al.

[11] Patent Number: 5,995,353
[45] Date of Patent: *Nov. 30, 1999

[54] APPARATUS FOR DISCHARGING AN ELECTROSTATIC DISCHARGE VIA A SPARK GAP COUPLED IN SERIES WITH A HIGH IMPEDANCE NETWORK

[75] Inventors: Randy M. Cunningham, Roseville; Glenn R. Beckett, Auburn; David Pommerenke, Rocklin; Kristie Amanna, Roseville, all of Calif.

[73] Assignee: Hewlett-Packard Company, Palo Alto, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/877,344

[22] Filed: Jun. 17, 1997

[51] Int. Cl.⁶ ........................................................ H02H 3/22
[52] U.S. Cl. ................................................................ 361/111
[58] Field of Search ................................... 361/18, 35, 38, 361/40, 58, 91, 111, 112; 178/69 E, 69 F, 69 K

[56] References Cited

U.S. PATENT DOCUMENTS

3,710,191  1/1973  Peche ....................................... 361/120
5,708,555  1/1998  Woodworth et al. ..................... 361/117

Primary Examiner—Ronald W. Leja
Attorney, Agent, or Firm—David A. Plettner

[57] ABSTRACT

An electrostatic discharge (ESD) damage prevention device is comprised of a spark gap coupled in series with a high-impedance network, with a first node of the series combination of the spark gap and high-impedance network coupled to a conductive location that may be subject to an electrostatic discharge and the second node coupled to a conductor capable of conducting away charge delivered by an ESD event. The spark gap defines the level of electrical isolation and the high-impedance network controls dissipation of charge delivered by an ESD event.

18 Claims, 7 Drawing Sheets

APPARATUS FOR DISCHARGING AN ELECTROSTATIC DISCHARGE VIA A SPARK GAP COUPLED IN SERIES WITH A HIGH IMPEDANCE NETWORK

FIELD OF THE INVENTION

The present invention relates to over-voltage protection of electrically isolated systems. More particularly, the present invention relates to a spark gap coupled in series with a high impedance network that provides an electronic interface with a high level of over-voltage protection, while meeting electrical isolation requirements.

DESCRIPTION OF THE RELATED ART

In the art of networked communications, it is common to electrically isolate a connection port on a network communication device from the network media that carries electrical signals between network communication devices. For example, Ethernet 10BaseT network communication devices must comply with International Standard ISO/IEC8802-3 (ANSI/IEEE Standard 802.3), and 100BaseT network communication devices must comply with the standards set forth in ANSI X3.263-1995, Section 8.4.1 1.

Figure 1:
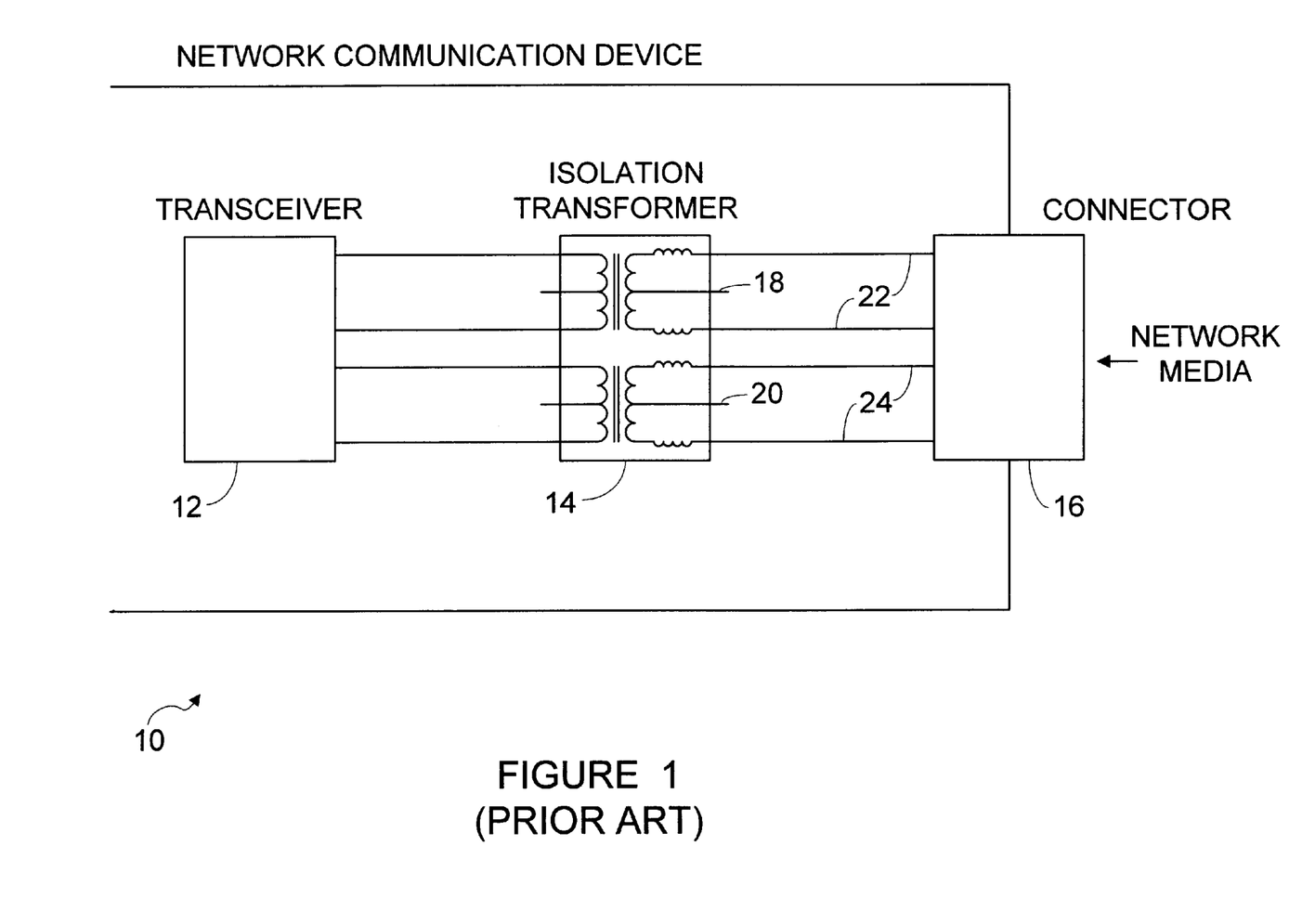
FIG. 1 shows a prior art network communication device.

For 10BaseT devices, the above standard requires that each PMA/MDI interface, such as that found at an RJ-45 connector, shall be isolated from ground. In addition, such interfaces must pass isolations tests at 1500 VAC or 2250 VDC. Typically, these standards are met by using an isolation transformer to isolate the network communication device from the network media. For example, FIG. 1 shows a prior art network communication device 10. Device 10 may represent a network adapter in a computer system or printer, a network hub, or any other network communication device known in the art. Within network communication device 10 is a transceiver 12 coupled to an isolation transformer 14. Isolation transformer 14 is also coupled to connector 16. Connector 16 is typically coupled to the network media.

While isolation transformers provide adequate electrical isolation, they do little to prevent damage caused by an electrostatic discharge (ESD) event. In fact, an isolation transformer may worsen the effects of an ESD event by not providing an escape path for the charge delivered during the ESD event.

Networking equipment must be able to withstand a defined 8 kV ESD, and in some occasions, up to 25 kV ESD. In the prior art, designers of network communication devices used various methods to comply with ESD standards. The simplest method is a "do nothing" approach in which no ESD solution is provided during the design of a device. After the device is constructed, a designer tests that device and hopes that it passes ESD testing.

Another approach is to couple a capacitor between center taps of the isolation transformer and ground. For example, in FIG. 1 capacitors may be coupled between ground and center taps 18 and 20. The capacitors buffer the charge delivered from an ESD event and increase the probability that the network communication device will not be damaged by the ESD event. Of course, the capacitors must be high voltage capacitors to withstand the isolation test voltages of 1500 VAC or 2250 VDC.

Yet another approach is to use an ESD "spark gap", which may be implemented as two parallel conductive electrodes located on a printed circuit board, with one electrode coupled to the center tap of the isolation transformer (or one conductor of a differential signal) and the other electrode coupled to ground, or some other low impedance path capable of removing charge delivered by an ESD event. The spark gap provides a well defined path to ground when an ESD event occurs, and the width of the spark gap can be selected to withstand isolation test voltages of 1500 VAC or 2250 VDC, or any other voltage level as required.

The final approach is a combination of the two previous approaches. A "spark gap capacitor" is a high voltage capacitor in parallel with a defined spark gap. A spark gap capacitor may be coupled between the center tap of an isolation transformer and ground.

Each of the above prior art approaches has certain disadvantages. First, each approach produces a relatively high current as the charge delivered by an ESD event is dissipated. This current, and its derivative, results in higher voltage at the transceiver caused by induction, or non-symmetry of the transformer. The higher voltage increases the possibility of the transceiver sustaining hardware damage.

Second, the capacitor approach (not including the spark gap capacitor) and the "do nothing" approach do not define a current path to conduct away charges delivered by an ESD event in the case of breakdown. Accordingly, the ESD current may travel between some point on the isolation transformer and some point on an adjacent structure, such as another conductor on the printed circuit board.

Third, both the capacitor approach and the spark gap capacitor approach provide a low impedance path for common mode high frequency signals from the network media to ground. The capacitance of the capacitor must be on the order of nanofarads to be effective against an ESD event. However, the typical capacitance between the network media and ground is on the order of 10 picofarads. Therefore, adding capacitance to mitigate the effects of an ESD event increases common mode currents associated with voltages less than the isolation voltage by orders of magnitude. The increased common mode currents lead to large differential mode noise signals caused by either unequal impedance between each twisted pair wire and ground, or imperfect symmetry of the transformer.

Thus, both the capacitor approach and the spark gap capacitor approach decrease the noise margin associated with the network connection and may cause a failure to occur during conducted immunity tests as defined in IEC 1000-4-6, or radiated immunity tests as defined in IEC 1000-4-3. Finally, both capacitive approaches are relatively expensive, costing between $0.15 and $0.25 per network interface.

SUMMARY OF THE INVENTION

The present invention is an electrostatic discharge (ESD) damage prevention device comprised of a spark gap in series with a high impedance network. The ESD damage prevention device is ideally suited for use with network communication devices, but may be employed in any electronic device requiring over-voltage protection and isolation. The ESD damage prevention device of the present invention includes a spark gap coupled in series with a high-impedance network, with a first node of the series combination of the spark gap and high-impedance network coupled to a conductive location that may be subject to an electrostatic discharge and a second node coupled to a conductor capable of conducting away charge delivered by an ESD event.

In one embodiment, the first node is a center tap of an isolation transformer, the high-impedance network includes any combination of inductors, resistors, and ferrite beads, and the second node is a digital ground or chassis ground. In a second embodiment, a first conductor of a differential signal coupled to a spark gap and high-impedance network, and the other conductor of the differential signal is coupled to a second spark gap and high-impedance network, with each spark gap and high-impedance network also coupled to the second node. In a third embodiment, each conductor of the differential signal is coupled to a unique electrode of a spark gap, and a common high-impedance network is attached to another electrode of the spark gap to conduct charge delivered by an ESD event to ground. The present invention may also include one of several unique spark gap configurations.

The present invention provides several advantages over the prior art, including low cost, a defined non-destructive current path to remove charge delivered by an ESD event, and excellent electrical isolation. In addition, the current and its derivative associated with an ESD event is reduced, which minimizes induced voltages, thereby avoiding latch-up and physical damage.

DETAILED DESCRIPTION OF THE PREFERRED EMBODIMENTS

Figure 2:
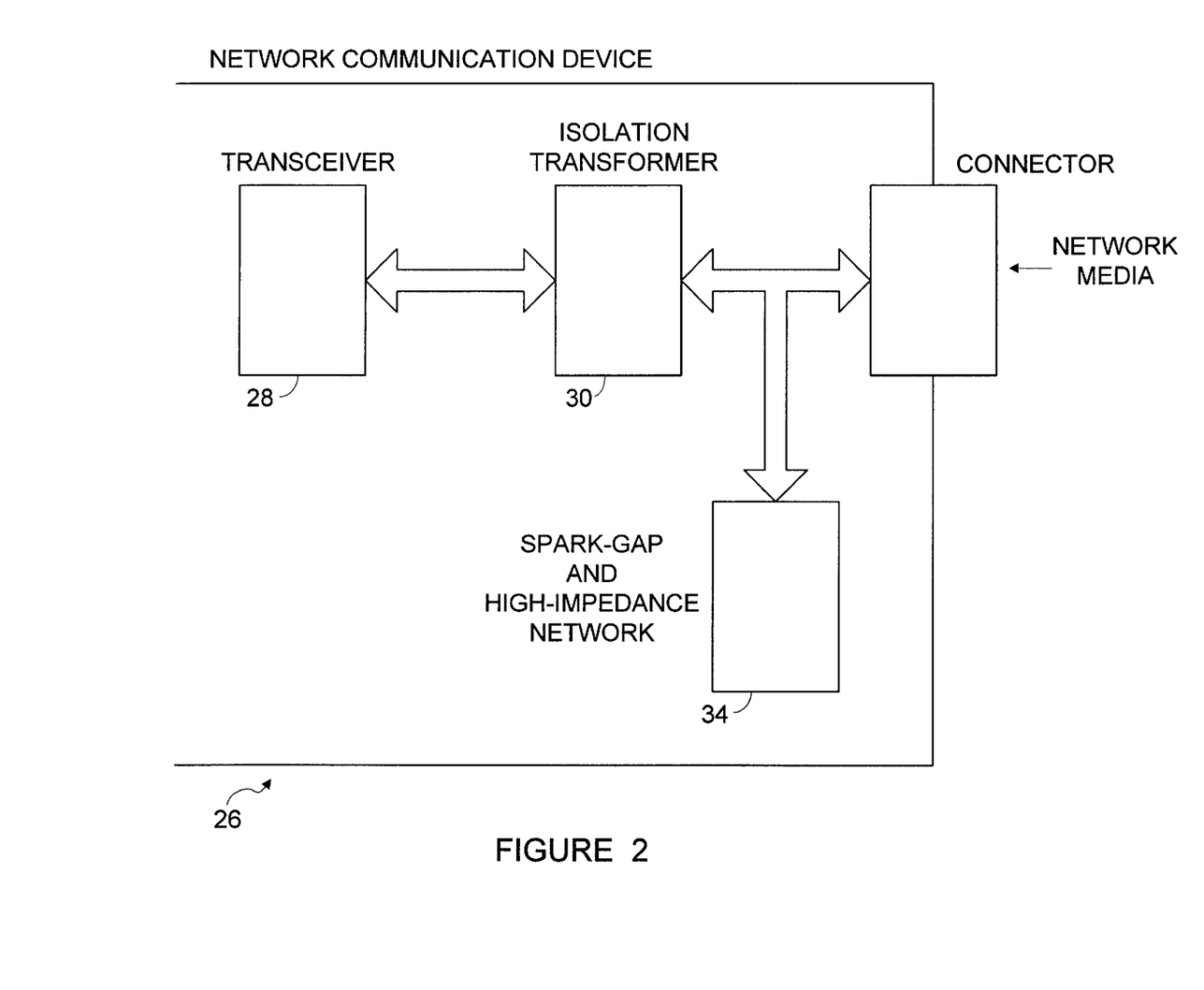
FIG. 2 is a block diagram of a network communication device provided with the spark gap and high-impedance network of the present invention.

FIG. 2 is a block diagram of a network communication device 26 provided with the spark gap and high-impedance network of the present invention. Although the present invention will be described herein with reference to a network communication device, those skilled in the art will recognize that the present invention may be used in any electronic system requiring over-voltage protection and having an electrically isolated interface that may be connected to signaling media.

Network communication device 26 includes transceiver 28, connector 32, and spark gap and high-impedance network 34, all of which are coupled to isolation transformer 30. Connector 32 is connectable to network media. Spark gap and high-impedance network 34 provides a defined current path for conducting away charge delivered by an ESD event, while providing adequate electrical isolation to meet the electrical isolation standards discussed above.

Figure 3:
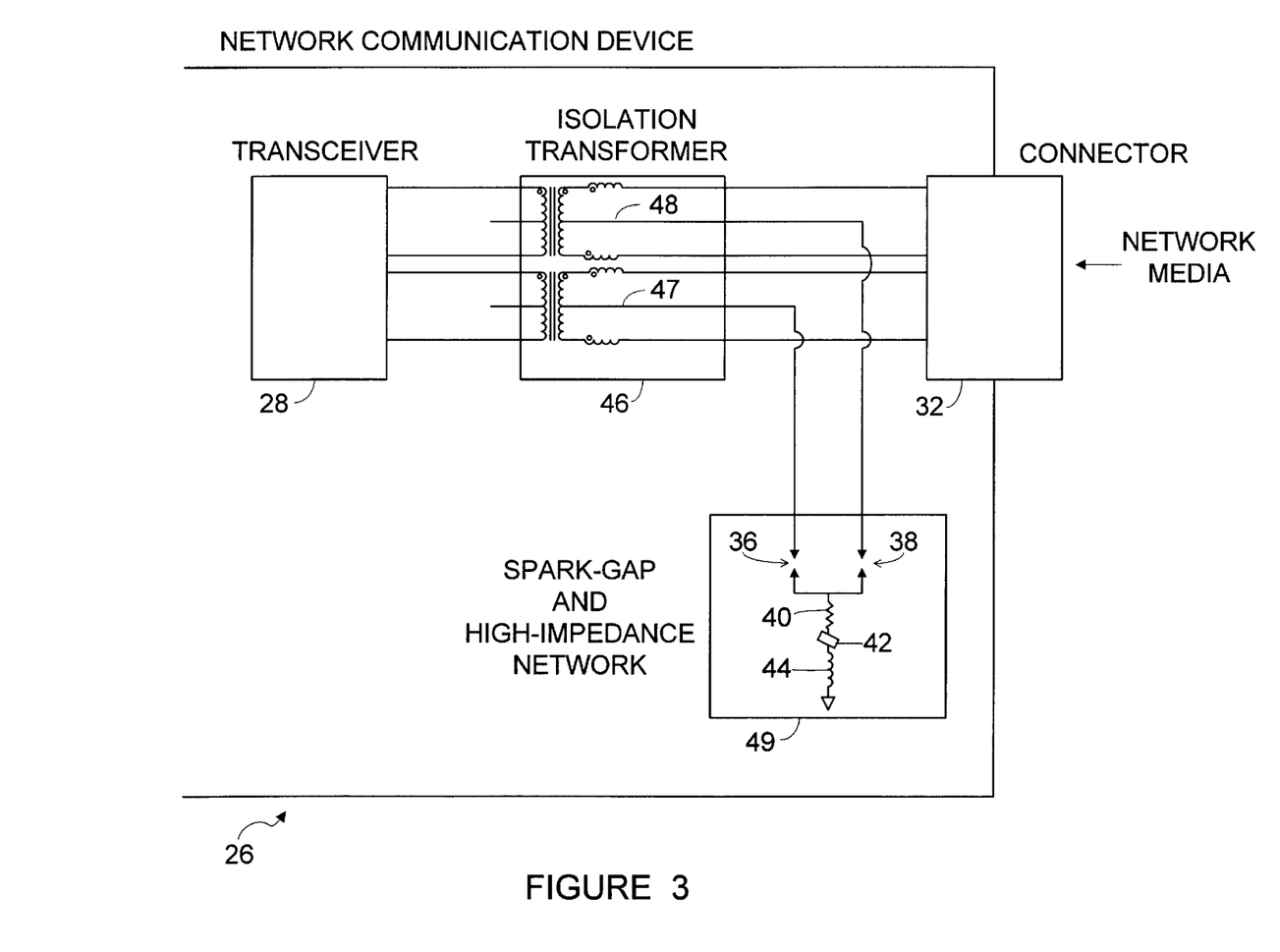
FIG. 3 is a block diagram of the network communication device of FIG. 2 having a first embodiment of the spark gap and high-impedance network of FIG. 2.

FIG. 3 is a block diagram of the network communication device 26 of FIG. 2 having a first embodiment 49 of spark gap and high-impedance network 34 of FIG. 2. Embodiment 49 includes spark gaps 36 and 38, resistor 40, ferrite bead 42, and inductor 44. In FIG. 3, isolation transformer 46 (which corresponds to transformer 30 in FIG. 2) has center taps 47 and 48. Center tap 47 is coupled to a first electrode of spark gap 36 and center tap 48 is coupled to a first electrode of spark gap 38. Resistor 40 has a first terminal coupled to second electrodes of spark gaps 36 and 38. A second terminal of resistor 40 is coupled to a first terminal of ferrite bead 42. A second terminal of ferrite bead 42 is coupled to a first terminal of inductor 44, and a second terminal of inductor 44 is coupled to a chassis or digital ground, or some other conductive path capable of conducting away charge delivered by an ESD event.

Spark gaps 36 and 38 allow the network interface to meet the isolation tests described above. The size of the spark gap may by varied to achieve any desired level of electrical isolation. The impedance network comprised of resistor 40, ferrite bead 42, and inductor 44 limits the instantaneous magnitude of the current caused by the charge delivered by an ESD event. Those skilled in the art will recognize that the component sizes and values associated with resistor 40, ferrite bead 42, and inductor 44, as well as the dimensions of spark gaps 36 and 38, may be varied to achieve a variety of electrical characteristics, including the level of electrical isolation desired and the ability to withstand ESD events of various magnitudes. In addition, the configuration and composition of the high-impedance network may be varied to achieve a variety of electrical characteristics. The components may be inductors, ferrite beads, and/or resistors, and the components may be coupled serially in any order. Generally, it is desirable to have the impedance of the high-impedance network be as high as possible, without an ESD event causing breakdown within a component or to an adjacent structure or conductor. If the impedance is too low, then the current and its derivative will be relatively high, which will produce the problems described above. If the impedance is too high, then a breakdown may occur within a resistor. In one preferred embodiment, the high-impedance network comprises a single resistor having a resistance of approximately 450 ohms, which substantially limits the current and its derivative without risking a breakdown within the resistor.

Figure 4:
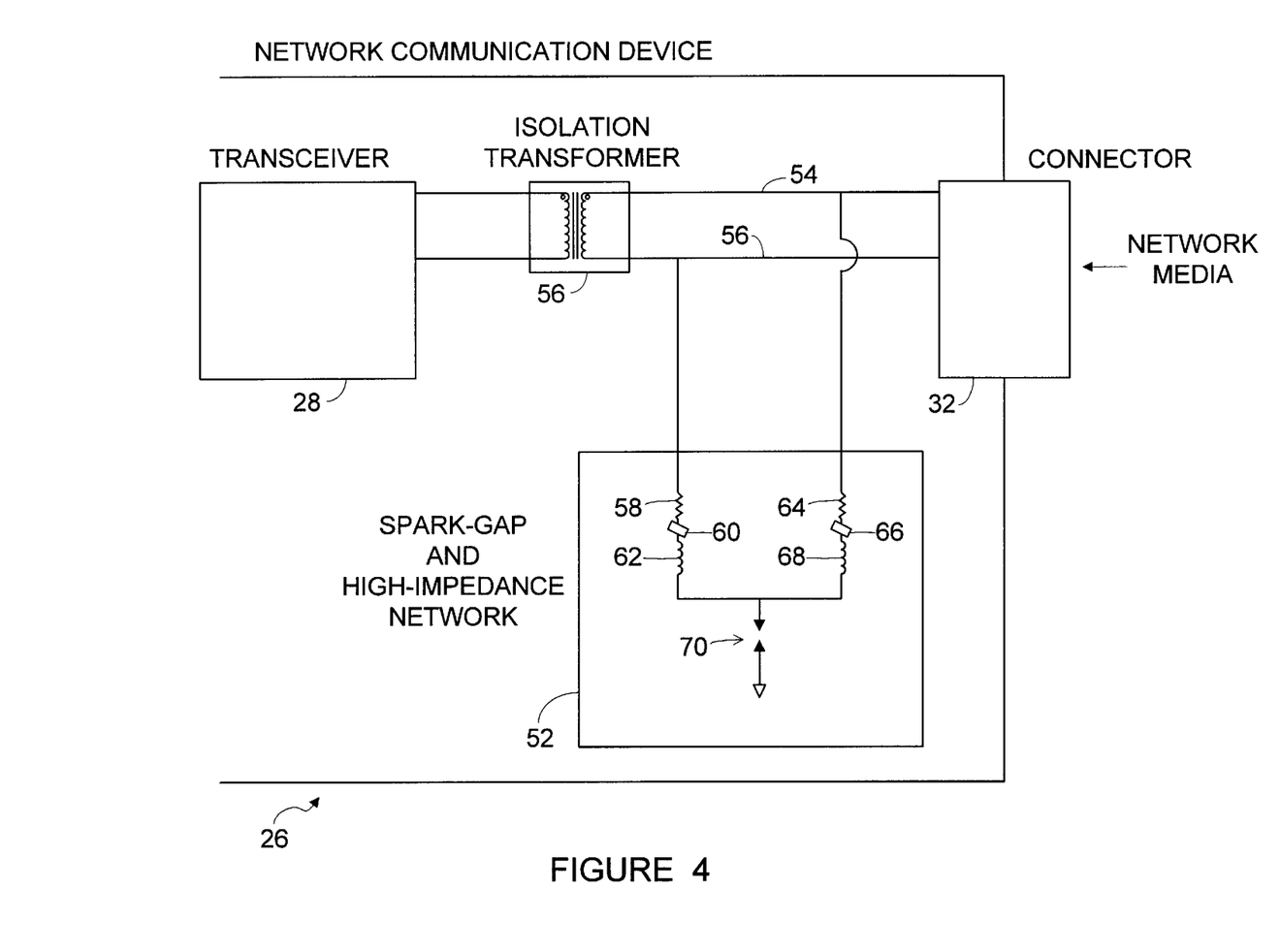
FIG. 4 is a block diagram of the network communication device of FIG. 2 having a second embodiment of the spark gap and high-impedance network of FIG. 2.

FIG. 4 is a block diagram of the network communication device 26 of FIG. 2 having a second embodiment 52 of spark gap and high-impedance network 34 of FIG. 2. This embodiment is well suited for isolation transformers that do not have a center tap, such as isolation transformer 50, which corresponds with isolation transformer 30 in FIG. 2. For convenience, transformer 50 is shown with only a single coil.

Spark gap and high-impedance network 52 comprises two high impedance networks coupled to a single spark gap, with each high impedance network coupled to a differential signal of a differential signal pair from isolation transformer 50. Specifically, resistor 58 has a first terminal coupled to differential signal 56 and a second terminal coupled to a first terminal of ferrite bead 60. A second terminal of ferrite bead 60 is coupled to a first terminal of inductor 62, and a second terminal of inductor 62 is coupled to a first electrode of spark gap 70. A second electrode of spark gap 70 is coupled to a chassis or digital ground, or some other conductive path capable of conducting away charge delivered by an ESD event.

Similarly, resistor 64 has a first terminal coupled to differential signal 54 and a second terminal coupled to a first terminal of ferrite bead 66. A second terminal of ferrite bead 66 is coupled to a first terminal of inductor 68, and a second terminal of inductor 68 is coupled to the first terminal of spark gap 70. As discussed with reference to FIG. 3, the high-impedance network may comprise any combination of resistors, ferrite beads, and inductors coupled together in any order.

Figure 5:
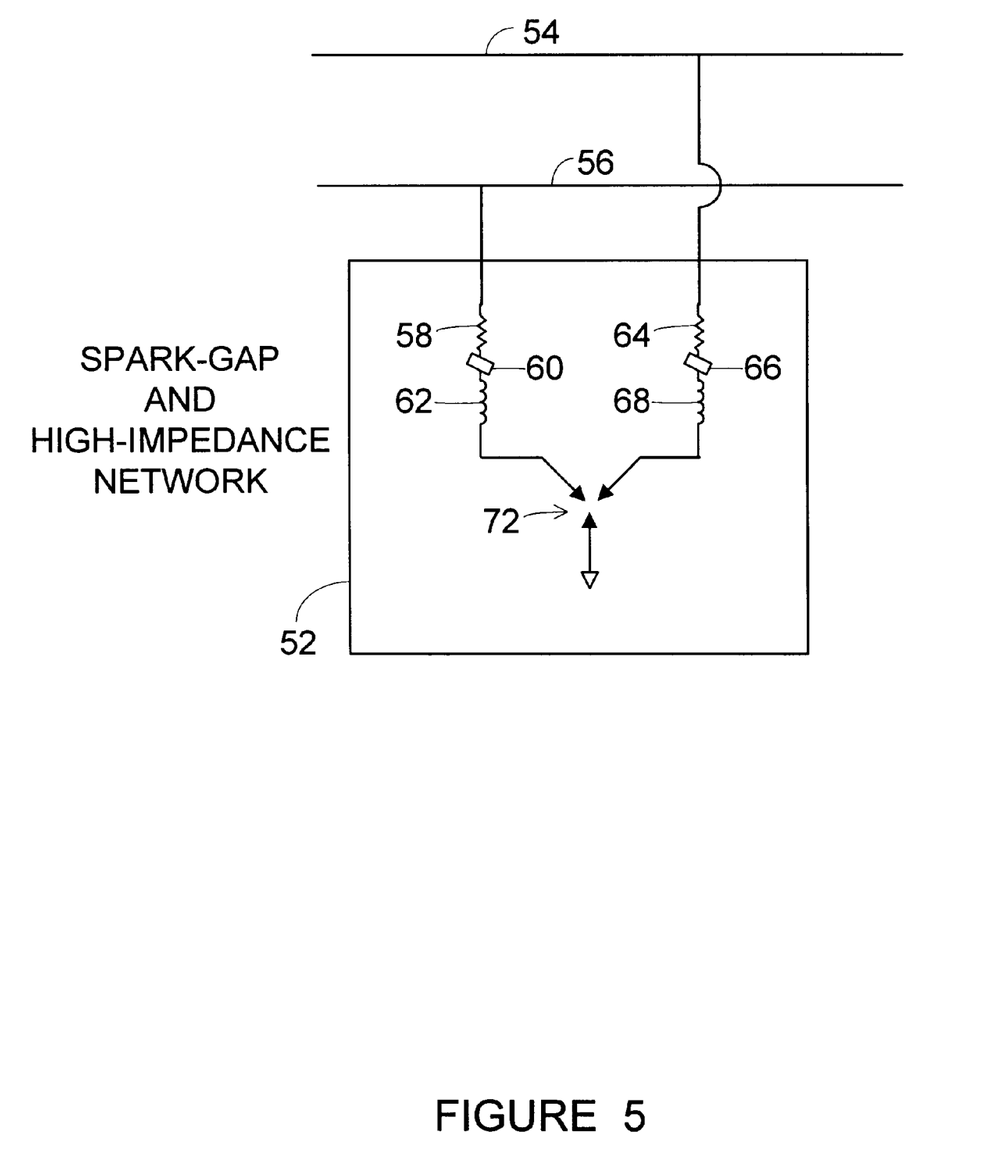
FIG. 5 shows an alternative embodiment of the spark gap and high-impedance network of FIG. 4.
Figure 6:
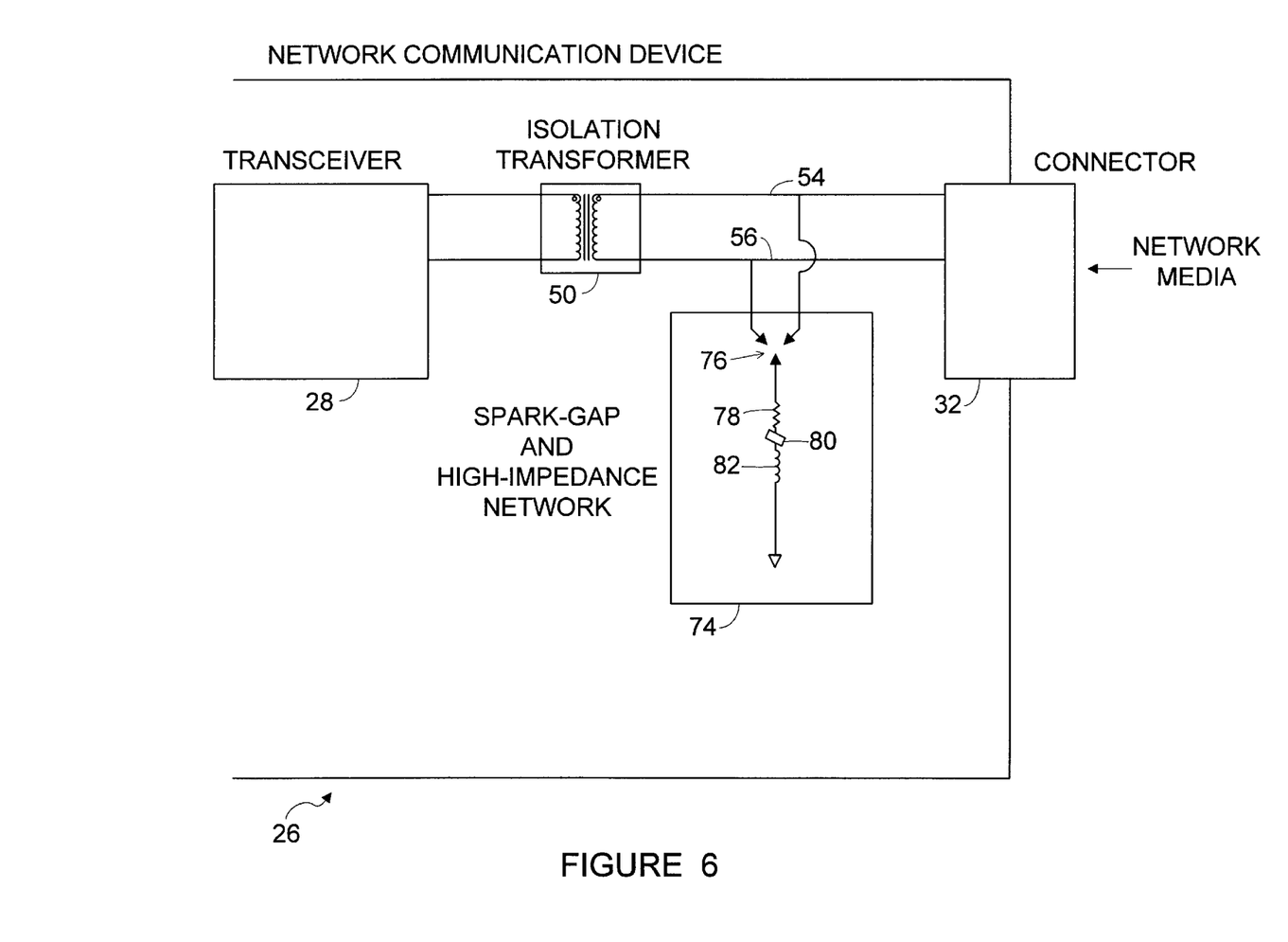
FIG. 6 is a block diagram of the network communication device of FIG. 2 having a another embodiment of the spark gap and high-impedance network of FIG. 2.

FIGS. 5 and 6 show embodiments of the spark gap and high-impedance network that utilize a three-electrode spark gap. FIG. 5 shows embodiment 52 of the spark gap and high-impedance network. The resistors, ferrite cores, inductors, and differential signals are arranged substantially as shown in FIG. 4. FIG. 6 is a block diagram of the network communication device 26 of FIG. 2 having a another embodiment 74 of spark gap and high-impedance network 34 of FIG. 2. As with network 52 of FIG. 4, network 74 is also well suited for use with an isolation transformer not having center taps, such as isolation transformer 50. Network 74 includes a three-electrode spark gap 76, resistor 78, ferrite bead 80, and inductor 82. Spark gap 76 has a first electrode coupled to differential signal 54, a second electrode coupled to differential signal 56, and a third electrode coupled to a first terminal of resistor 78. Resistor 78 has a second terminal coupled to a first terminal of ferrite bead 80, and ferrite bead 80 has a second terminal coupled to a first terminal of inductor 82. Inductor 82 has a second terminal coupled to a chassis or digital ground, or some other conductive path capable of conducting away charge delivered by an ESD event. Since spark gap and high-impedance network 74 has a single high-impedance network, it costs less to construct than spark gap and high-impedance network 52 of FIG. 5, which has two high-impedance networks.

Figure 7:
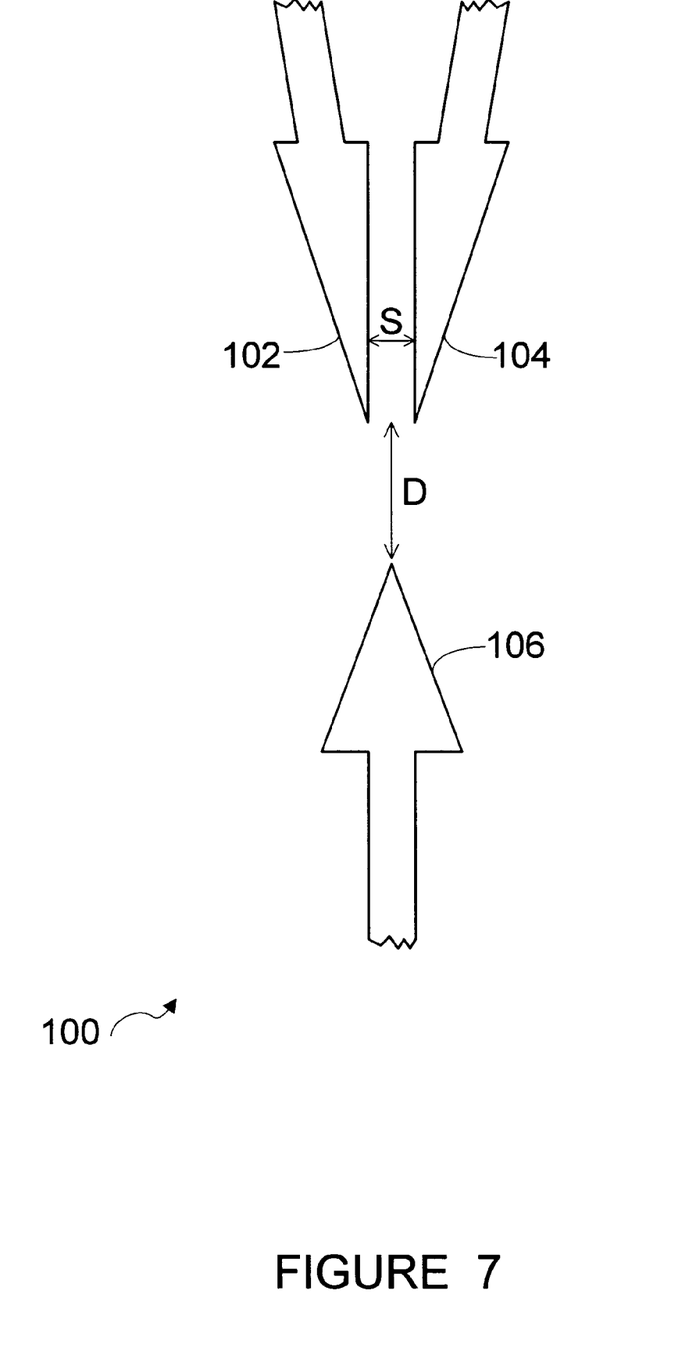
FIG. 7 shows and an embodiment of a three-electrode spark gap that may be used to implement the spark gap shown in FIG. 5 or the spark gap shown in FIG. 6.

FIG. 7 shows and an embodiment 100 of a three-electrode spark gap that may be used to implement spark gap 72 in FIG. 5 and spark gap 76 in FIG. 6. Three-electrode spark gap 100 comprises electrodes 102, 104, and 106. Electrodes 102 and 104 are coupled to the differential signals, either directly or via high-impedance networks, and electrode 106 is coupled to a chassis or digital ground, or some other conductive path capable of conducting away charge delivered by an ESD event.

In computer network applications, the differential signals are typically just a couple of volts in magnitude. Accordingly, the distance "S" separating electrodes 102 and 104 may be made as small as practically possible. In contrast, the distance "D" determines the level of electrical isolation, and may be varied to achieve various isolation levels as discussed above.

In FIG. 7, the configuration of spark gap 100 helps ensure that an ESD event occurring at one conductor of a differential signal pair does not cause an induced, long lasting, voltage spike on the transceiver side of the isolation transformer. Assume there is an ESD event to conductor 56, thereby causing a spark to form either between electrodes 102 and 106, or between electrodes 104 and 106. If the spark forms between electrodes 102 and 106, the current flow will not cause a large differential voltage at the transceiver. However, assume that a spark forms between electrodes 104 and 106 after an ESD event on conductor 56. Now the current flow through the transformer will cause a large differential voltage at the transceiver that may destroy it. However, the current flow also causes a voltage drop across resistor 64, ferrite bead 66, and inductor 68. This voltage will be present between electrodes 102 and 106 and will cause the spark to move to this gap ensuring a low differential voltage generated at the transceiver inputs. In the case of an ESD event delivered to a circuit board ground plane, the high-impedance networks will cause an even current distribution through both spark gaps, again preventing high voltages from being coupled across the isolation transformer to stress the transceiver inputs. Since it cannot be predicted whether an ESD event will occur at conductor 54 or 56, or to the ground plane, it cannot be predicted whether a spark will first form between electrodes 102 and 106, or between electrodes 104 and 106. Therefore, three-electrode spark-gap 100 provides a common-mode isolation voltage determined by the distance "D" before a trigger event, and a high-frequency differential mode isolation voltage determined by the distance "S" during the time period in which a spark is present between electrode 106 and either electrode 102 or 104.

The present invention provides many advantages over the prior art. First, the present invention is relatively low cost. Prior art solutions using capacitors cost between $0.15 and $0.25 per interface. In contrast, the cost of a spark gap in series with the a high impedance network in accordance with the present invention is approximately $0.02.

While the spark gap employed by the present invention provides electrical isolation for a network interface, the high impedance network limits the current produced by an ESD event. Limiting the current and its derivative minimizes induced voltages that can cause latch-up, and physical damage. The present invention allows a network communication device to sustain a ESD event of up to 25 kV without sustaining damage.

Although the present invention has been described with reference to preferred embodiments, workers skilled in the art will recognize that changes may be made in form and detail without departing from the spirit and scope of the invention.

What is claimed is:

1. An electrostatic discharge (ESD) protection device for conducting away charge delivered by an ESD event comprising:
   a first conductive portion at which charge delivered by an ESD event may be present;
   a second conductive portion capable of conducting away charge delivered by an ESD event;
   a spark gap;
   a high-impedance network coupled in series with the spark gap, wherein the spark gap coupled in series with the high impedance network has a first node coupled to the first conductive portion and a second node coupled to the second conductive portion such that charge delivered from an ESD event travels from the first conductive portion through the high-impedance network and the spark gap to the second conductive portion, and wherein the high-impedance network remains high-impedance during the ESD event.

2. The ESD protection device of claim 1 wherein the first conductive portion comprises a center tap of an isolation transformer.

3. The ESD protection device of claim 1 wherein the first conductive portion comprises a first conductor of a differential signal connected to an isolation transformer.

4. The ESD protection device of claim 1 wherein the second conductive portion comprises a chassis ground.

5. The ESD protection device of claim 1 wherein the second conductive portion comprises a digital ground.

6. The ESD protection device of claim 1 wherein the high-impedance network comprises at least one component selected from the group of resistors, inductors, and ferrite beads.

7. The ESD protection device of claim 1 wherein the high-impedance network comprises a resistor.

8. The ESD protection device of claim 7 wherein the high-impedance network further comprises:

a ferrite bead; and an inductor, wherein the resistor, ferrite bead, and inductor are coupled together in series.

9. The electrostatic discharge (ESD) protection device of claim 1 wherein current can only travel between the first and second nodes via the spark gap.

10. An eletronic device having an isolated interface comprising;

a transceiver;

an isolation transformer coupled to the transceiver;

a connector coupled to the isolation transformer, with the connecter capable of being connected to signaling media;

a spark gap; and a high-impedance network coupled to the spark gap, wherein the spark gap coupled in series with the high-impedance network has a first node coupled to the isolation transformer and a second node coupled to a conductor capable of conducting away charge delivered by an ESD event, and wherein the high-impedance network remains high-impedance during the ESD event.

11. The electronic device of claim 10 wherein the first node is coupled to a center tap of the isolation transformer.

12. The electronic device of claim 10 wherein the first node is coupled to a first conductor of a differential signal that is coupled between the isolation transformer and the connector.

13. The electronic device of claim 10 wherein the conductor comprises a chassis ground.

14. The electronic device of claim 10 wherein the conductor comprises a digital ground.

15. The electronic device of claim 10 wherein the high-impedance network comprises at least one component selected from the group of resistors, inductors, and ferrite beads.

16. The electronic device of claim 10 wherein the high-impedance network comprises a resistor.

17. The eletronic device of claim 16 wherein the high-impedance network further comprises:

a ferrite bead; and an inductor, wherein the resistor, ferrite bead, and inductor are coupled together in series.

18. The electronic device of 10 wherein current can only travel between the first and second nodes via the spark gap.

* * * * *